United States Patent [19]
Wuebker et al.

[11] Patent Number: 5,942,109
[45] Date of Patent: Aug. 24, 1999

[54] APPARATUS FOR THE TREATMENT OF LIQUIDS

[75] Inventors: Josef Wuebker; Dieter Hoffmeier, both of Ibbenbueren, Germany

[73] Assignee: OASE-PUMPEN Wuebker Soehne GmbH & Co., Hoerstel, Germany

[21] Appl. No.: 08/984,747

[22] Filed: Dec. 4, 1997

[30] Foreign Application Priority Data

Dec. 5, 1996 [DE] Germany ................ 196 50 561

[51] Int. Cl.[6] ................................. B01J 19/08
[52] U.S. Cl. .................. 210/198.1; 210/169; 210/232; 250/431; 250/435; 250/436; 422/186.3
[58] Field of Search ............................ 210/198.1, 748, 210/232, 169; 422/186.3; 250/431, 435, 436; 15/104.04, 246.5

[56] References Cited

U.S. PATENT DOCUMENTS

| | | | |
|---|---|---|---|
| 3,462,597 | 8/1969 | Young | 250/431 |
| 4,054,527 | 10/1977 | Esmond | 210/456 |
| 5,106,491 | 4/1992 | Schulze et al. | 210/198.1 |
| 5,260,036 | 11/1993 | Weigold et al. | 422/186.3 |
| 5,266,280 | 11/1993 | Hallett | 422/186.3 |

FOREIGN PATENT DOCUMENTS 2332455  6/1973  Germany ................ 250/431

*Primary Examiner*—Jay H. Woo
*Assistant Examiner*—Frank M. Lawrence
*Attorney, Agent, or Firm*—Jordan and Hamburg LLP

[57] ABSTRACT

An apparatus for the treatment of liquids, particularly of cycled water of fish tanks or of ponds with an irradiation unit which is intended to act upon the liquid with light, particularly UV light, and includes at least one lamp which is disposed in a dry space that is separated from the liquid to be irradiated by a transparent glass shield, has at least one cleaning element which faces the glass shield and is disposed movably on the side of the glass shield in contact with the liquid.

9 Claims, 4 Drawing Sheets

APPARATUS FOR THE TREATMENT OF LIQUIDS

BACKGROUND OF THE INVENTION

The invention relates to an apparatus for the treatment of liquids, particularly of cycled water of fish tanks or of ponds.

Apparatuses of the above-named type find use, for example, for cleaning garden ponds, for which the pond water initially is aspirated by a circulating pump and then supplied to the apparatus named above, in which the water is purified, on the one hand by removing solids and, on the other, by removing bacteria and other biological elements. For this purpose, the apparatus contains, aside from a filtering unit, an irradiating unit, in which the water passing through is irradiated with light, particularly with UV light, in order to bring about a sterilization here. In particular, gas discharge lamps, which irradiate in the ultra-violet range, are used for this purpose. Such gas discharge lamps usually are tubular in construction and are embedded in a protective glass tube, the outside of which is in contact with the liquid that is to be purified.

It is also possible for the glass shield to be flat or to have a different shape. In any case, it separates the lamp, which is in a dry space, from the liquid. In this connection, the problem arises that the protective glass is exposed to contamination on the side facing the liquid, as a result of which the transparency of the glass shield decreases, so that it must be cleaned at regular intervals. For this purpose, the irradiating unit usually has to be dismantled, which is associated with appreciable effort and risk with regard to the current-carrying parts and irradiation by UV light.

SUMMARY OF THE INVENTION

It is therefore an object of the invention to improve the operational safety and reduce the need for maintenance for such apparatuses, without obtaining a construction, which is structurally expensive or difficult to install and dismantle.

By the arrangement of a cleaning element, which faces the glass shield and is movable on the side in contact with the liquid, it is achieved that, without dismantling the irradiating unit, the glass shield can be cleaned so that its transparency is retained and the maintenance costs are clearly reduced.

If, as is frequently the case for gas discharge tubes, the lamp is surrounded by an essentially cylindrical glass shield, the outside of which is in contact with the liquid that is to be purified, the cleaning element is preferably constructed as a ring, which encircles the cylindrical glass shield and can be moved along the longitudinal axis of the glass shield in contact with it.

For this purpose, a ferromagnetic object can be used, which is assigned to the ring and is guided by means of a counter piece, also of ferromagnetic material, which can be moved on the outside along the irradiation unit. For this magnetic coupling, for which at least one of the ferromagnetic objects is a permanent magnet, an opening in the housing of the irradiation unit is not required, so that the watertightness of the latter is not affected.

Particularly in the case of irradiation units, in which the liquid level does not exceed a certain height, it is also possible to operate the cleaning element over push rods or the like, for which an operating lever is passed through an opening in the housing to the outside.

The cleaning element can be constructed as a brush as well as a squeegee. In each case, mechanical removal of solids deposited on the glass shield is achieved.

If the cleaning element comprises at least two cleaning bodies on opposite sides of a carrier, it is ensured that the cleaning of the glass shield can be carried out up into the edge region of the shield, so that there are no places at the ends, which have not been cleaned.

The operational safety is increased by an alternative version of the invention if the electrical contacts, at the end of the gas discharge lamp, are connected at their accessible ends by way of terminal caps, which not only carry the electrical connections, but also close off the dry space tightly, so that the dismantler is not exposed to UV light since the electrical contact for supplying the light is interrupted when the cap is removed.

Furthermore, a particular advantageous version of the invention sees to it than an irradiating unit is constructed so that it comprises two housing halves of identical construction. This reduces the manufacturing costs and also simplifies maintenance and the procurement of spare parts.

Further advantages and details arise out of the drawing and the following description of an example of the object of the invention.

IN THE DRAWINGS

DESCRIPTION OF THE PREFERRED EMBODIMENTS

Figure 1:
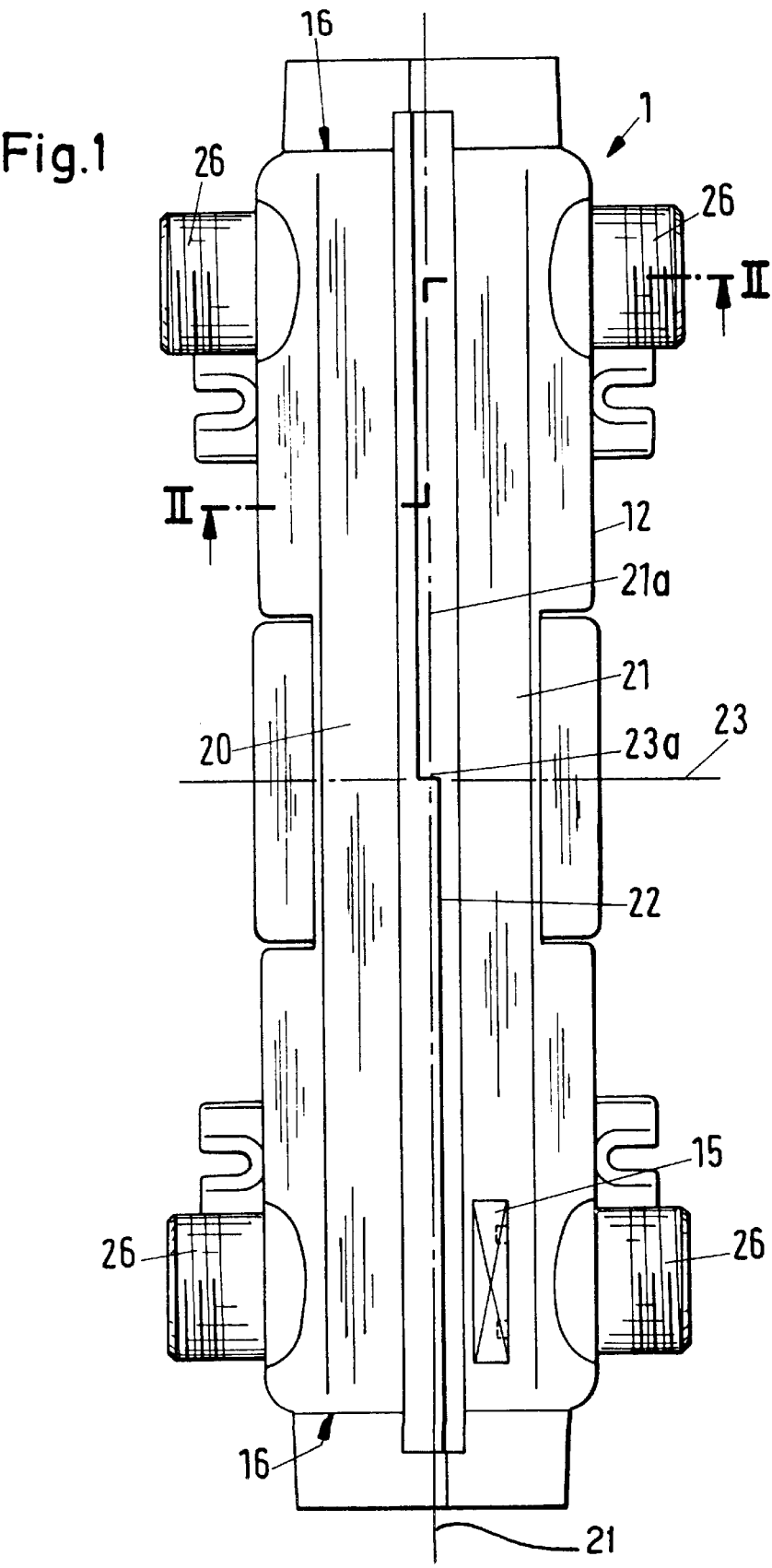
FIG. 1 shows an irradiating unit in plan view.
Figure 2:
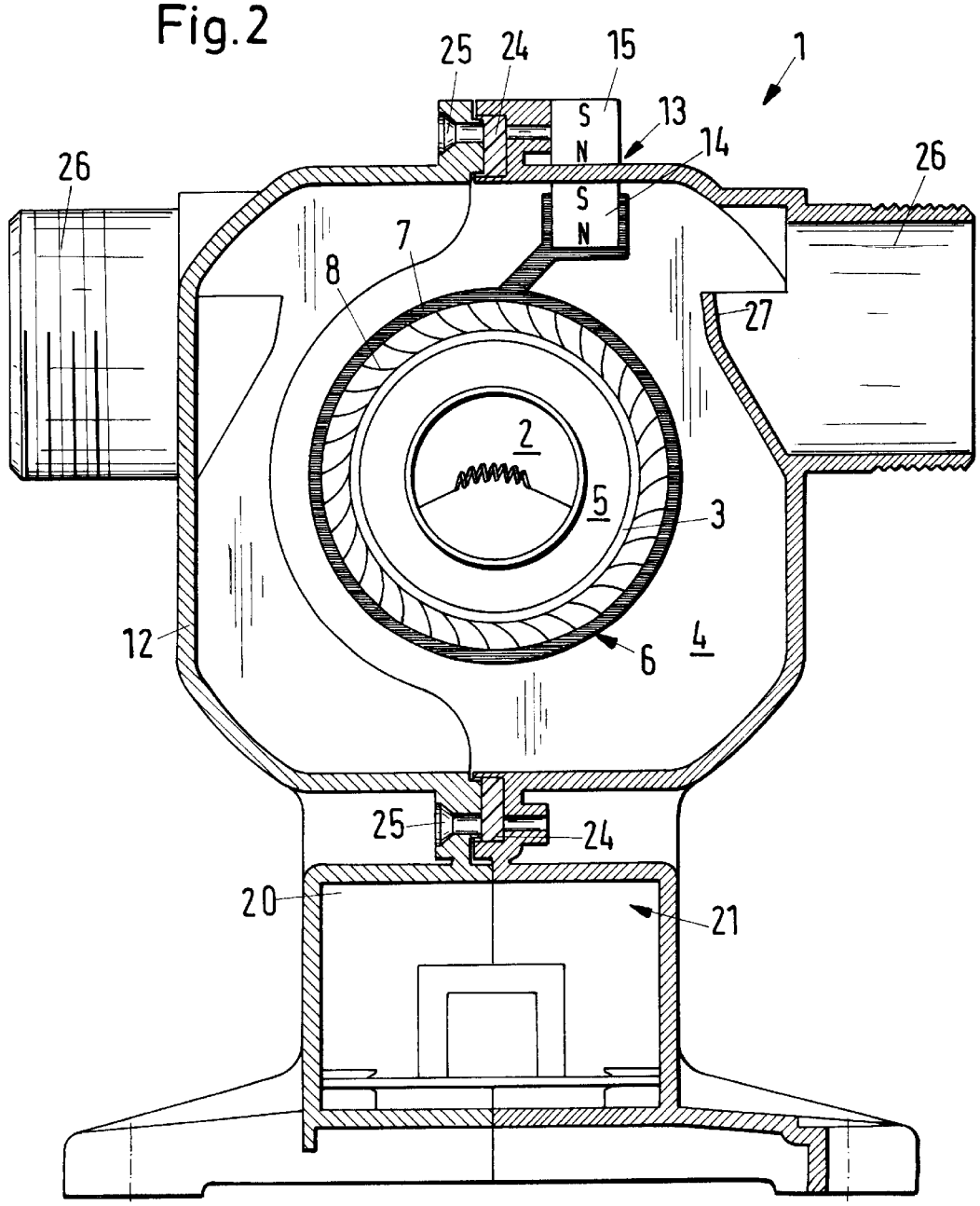
FIG. 2 shows a section along the line II—II of FIG. 1
Figure 3:
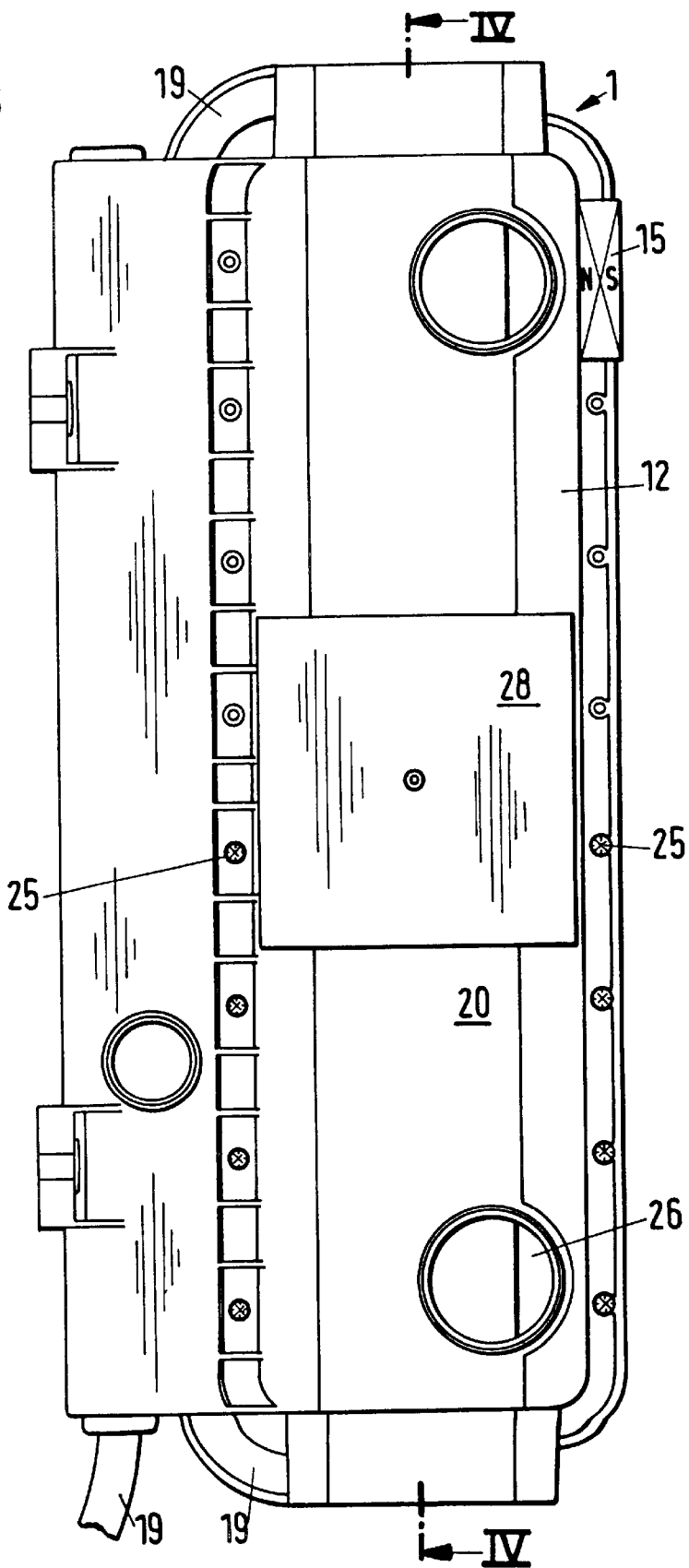
FIG. 3 shows an irradiating unit in side view.
Figure 4:
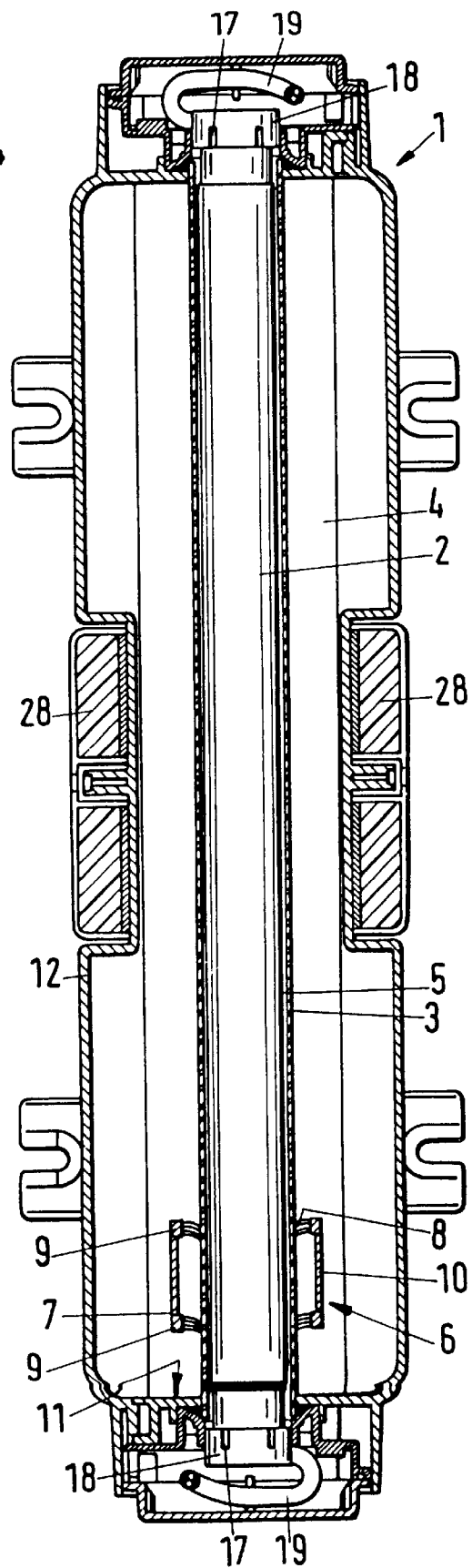
FIG. 4 shows a section along the line IV—IV of FIG. 3.

In particular, the irradiating unit 1 has an internal gas discharge lamp 2, which is separated by a cylindrically round glass shield 3 from the liquid space 4 of the irradiation unit 1, a dry space 5 remaining between the glass shield 3 and the gas discharge lamp 2.

In the present example, the lamp 2 is constructed as gas discharge tubes, contacted at two sides. However, tubes, which are contacted at only one side, also come into consideration, as do different types of lamps and UV radiation sources. Moreover, the glass shield 3 need not be cylindrical, but can also be flat or angular or otherwise adapted to the shape of the lamps 2 or to the geometrical requirements of the irradiating unit 1. The glass shield 3 can also be surrounded completely on the outside by liquid; however, when it is in the lid region of an irradiating unit, it can also be wetted only partially by liquid or be above a liquid level.

The number of gas discharge lamps 2, disposed in the irradiation unit, is also variable.

On the side of the glass shield 3, in contact with the liquid, a cleaning element 6 is mounted, which is movable with respect to the glass shield 3 and, when the glass shield 3 is constructed as a cylindrically round body, comprises a ring 7, which encircles the glass shield 3 and is constructed either as a continuous ring or, and this is not shown, has an interruption in its periphery, so that it is under tension in the sense of a higher contacting pressure with respect to the glass shield 3 that is to be cleaned. The ring 7 is provided on the inside with bristles 8, so that the cleaning element 6 as a whole is constructed as a brush. The cleaning element 6 can likewise be constructed as a squeegee, for which spatula-like cleaning elements come into consideration in the case of flat glass shields 3. A sponge-like construction of a cleaning element is also conceivable. In any case, the cleaning element 6 must be constructed so that it is not destroyed by the radiation emanating from the lamp 2.

The cleaning element 6 comprises two cleaning bodies 9, which are disposed at two opposite ends of a supporting body 10. By these means, it becomes possible, by moving the cleaning element into the extreme positions, to clean the glass shield 3 in each case up to the outer edge, since the cleaning bodies 9 then lie against the inner wall 11 of the housing 12 of the irradiation unit 1. In order to enable the cleaning element 6 to be moved along the glass shield 3, a control element 13 is assigned to the ring 7 of the cleaning element 6 encircling the glass shield. The control element comprises a ferromagnetic body 14, which is disposed in the interior of the housing 12 and connected rigidly with the ring 7 and the movement of which is driven by an external ferromagnetic body 15, which can be moved on the outside of the housing 12 at least along the longitudinal axis of the glass shield 3. By means of magnetic coupling, a movement of the ferromagnetic body 15 brings about a similar movement of the ferromagnetic body 14 and, with that, a movement of the cleaning element 6, which is connected with this ferromagnetic body 14.

At least one of the two ferromagnetic bodies 14, 15 is constructed as a permanent magnet. For guiding the ferromagnetic bodies 14, 15, guiding paths may also be formed at the housing 12, so that only a movement along the longitudinal axis of the glass shield 3 is possible.

Alternative possibilities for moving the cleaning element 6 come into consideration, such as a linkage rod system (not shown), which is passed through the end faces 16 of the housing 12 and possibly lies above a liquid level, so that the sealing requirements are slight. With appropriate sealing, the control element 13 can also be taken to the outside into a liquid-occupied region; however, this increases the construction costs to a relatively high level.

Especially for an irradiating unit 1 with a cleaning element of the type described above, but also for other irradiating units 1 with tubular gas discharge lamps 2, which have contacts 17 at their two ends, terminal caps 18 are constructed so that, on the one hand, they carry the electrical contacts of the tubes 2, which are brought by the cable 19 to the terminal caps 18 and, on the other, close off the dry space 5 to the end faces 16 liquid tight and optically. When such a terminal cap 18 is pulled off, the voltage supplied to the lamp 2 is interrupted so that the danger, that a dismantler will be exposed to the UV radiation of lamp 2, is reliably avoided. The lamp 2 can therefore be operated only if the terminal cap 18 is in place, in which case, however, light is prevented from emerging from the irradiation unit 1 towards the end faces 16.

In order to improve the dismantling and also the procurement of spare parts even further, the housing 12 consists of two identically constructed halves 20, 21, which are connected to one another along a parting line 22 and constructed axially symmetrically and, in plan view (FIG. 1), to a vertical axis 21, which lies in the longitudinal median plane 21a of the irradiation unit 1 and which intersects the transverse median plane 23 at 23a as shown in FIG. 1. As a result, only one component 20 or 21 which, in duplicate, opposite arrangement, forms the housing 12, is required to form a housing 12 of the irradiation unit 1.

Aside from being axially symmetrical, the parts 20, 21 can also be symmetrical to one of the median planes. The housing halves 20, 21 are separated by seals 24, screws 25 being passed through seals 24 for fixing the housing halves 20, 21.

The housing 12 is provided with water inlets and outlets 26, which are equipped with a shield 27, in order to avoid here also the emergence of UV light from disconnected connections 26.

Moreover, the housing 12 can be provided at the side with magnets 28, which are disposed symmetrically to the longitudinal axis of the irradiation unit 1 and are provided for changing the molecules that determine water hardness.

What we claim is:

1. Apparatus for the treatment of liquid comprising an enclosure for the liquid; a glass shield in said enclosure defining a dry space which is separated from the liquid in the enclosure, an irradiation unit comprising at least one lamp disposed in said dry space, a cleaning unit movably disposed in said enclosure in contact with said liquid in said enclosure for cleaning said glass shield, said cleaning unit comprising a ring disposed about said glass shield, and a control device operable externally of said enclosure for moving said ring along said glass shield, said enclosure having an inside and an outside, said control device comprising a first magnetic body connected to said ring, said first magnetic body being disposed in said enclosure, a second magnetic body movable along the outside of said enclosure, said second magnetic body being disposed opposite said first magnetic body.

2. Apparatus according to claim 1 wherein said glass shield is an elongated glass shield having a longitudinal axis, said control device moving said ring along said glass shield in a direction parallel to said longitudinal axis.

3. Apparatus according to claim 1 wherein movement of said second magnetic body along the outside of said enclosure effects movement of the first magnetic body along the inside of said enclosure due to the magnetic coupling between said first and second magnetic bodies.

4. Apparatus according to claim 1 wherein said first and second magnetic bodies are ferromagnetic bodies.

5. Apparatus according to claim 1 wherein at least one of said first and second magnetic bodies is a permanent magnet.

6. Apparatus for the treatment of liquid comprising an enclosure for the liquid; a shield in said enclosure defining a dry space which is separated from the liquid in the enclosure, an irradiation unit disposed in said dry space, a cleaning unit movably disposed in said enclosure in contact with said liquid in said enclosure for cleaning said shield, and a control device operable externally of said enclosure for moving said cleaning unit along said shield, said enclosure having an inside and an outside, said control device comprising a first magnetic body connected to said cleaning unit, said first magnetic body being disposed in said enclosure, a second magnetic body movable along the outside of said enclosure, said second magnetic body being disposed opposite said first magnetic body.

7. Apparatus according to claim 6 wherein said enclosure includes a housing unit comprising two axially symmetrical and structurally identical halves which are duplicates of one another such that any one of a plurality of said housing halves is interchangeable with any other housing half of said plurality of housing halves such that any two of said plurality of housing halves can be assembled to form a single housing unit.

8. Apparatus according to claim 6 wherein said irradiation unit includes an essentially tubular gas discharge lamp having end portions, contacts at said end portions, and terminal caps disposed on said end portions for making an electrical connection with said contacts and for closing off the end portions of the discharge lamp.

9. Apparatus according to claim 6 wherein said cleaning unit comprises a ring encircling the shield, said ring be constructed as an open ring which is under tension such that the open ring biasingly engages said shield.

\* \* \* \* \*